United States Patent
Kim et al.

(10) Patent No.: US 11,088,955 B2
(45) Date of Patent: Aug. 10, 2021

(54) HIGH PRIORITY NETWORK TRAFFIC HANDLING

(71) Applicant: Ford Global Technologies, LLC, Dearborn, MI (US)

(72) Inventors: Yangho Kim, Northville, MI (US); Rajesh Balaji Vijayan, Plymouth, MI (US); Aziz Makkiya, Troy, MI (US); John Naum Vangelov, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 81 days.

(21) Appl. No.: 16/515,618

(22) Filed: Jul. 18, 2019

(65) Prior Publication Data

US 2021/0021530 A1    Jan. 21, 2021

(51) Int. Cl.
*H04L 12/859* (2013.01)
*H04L 12/851* (2013.01)
*H04W 28/02* (2009.01)
*H04W 4/48* (2018.01)

(52) U.S. Cl.
CPC ...... *H04L 47/2475* (2013.01); *H04L 47/2408* (2013.01); *H04W 4/48* (2018.02); *H04W 28/021* (2013.01)

(58) Field of Classification Search
CPC ..... H04L 47/10; H04L 47/30; H04L 12/5602; H04L 12/5601; H04Q 11/0478
USPC ........................................................ 370/236
See application file for complete search history.

(56) References Cited

U.S. PATENT DOCUMENTS

| | | | |
|---|---|---|---|
| 9,418,489 B2 * | 8/2016 | Macdonald | ............ G07C 5/008 |
| 9,607,449 B1 * | 3/2017 | Chen | ....................... H04L 67/12 |
| 10,142,830 B2 | 11/2018 | Dong | |
| 2011/0007746 A1 * | 1/2011 | Mudigonda | ......... G06F 9/45558 370/395.21 |

* cited by examiner

*Primary Examiner* — Peter G Solinsky
*Assistant Examiner* — Sanjay K Dewan
(74) *Attorney, Agent, or Firm* — Michael Spenner; Brooks Kushman P.C.

(57) ABSTRACT

A vehicle includes a telematics control unit; and one or more processors in communication with the telematics control unit via an in-vehicle network, programmed to generate a data packet for an application, containing a quality-of-service identifier indicative of priority and a type-of-service identifier indicative of sub-priority below the priority for the application; designate an access point name to the data packet based on the quality-of-service identifier; and communicate the data packet to the telematics control unit to communicate to a wireless network.

17 Claims, 4 Drawing Sheets

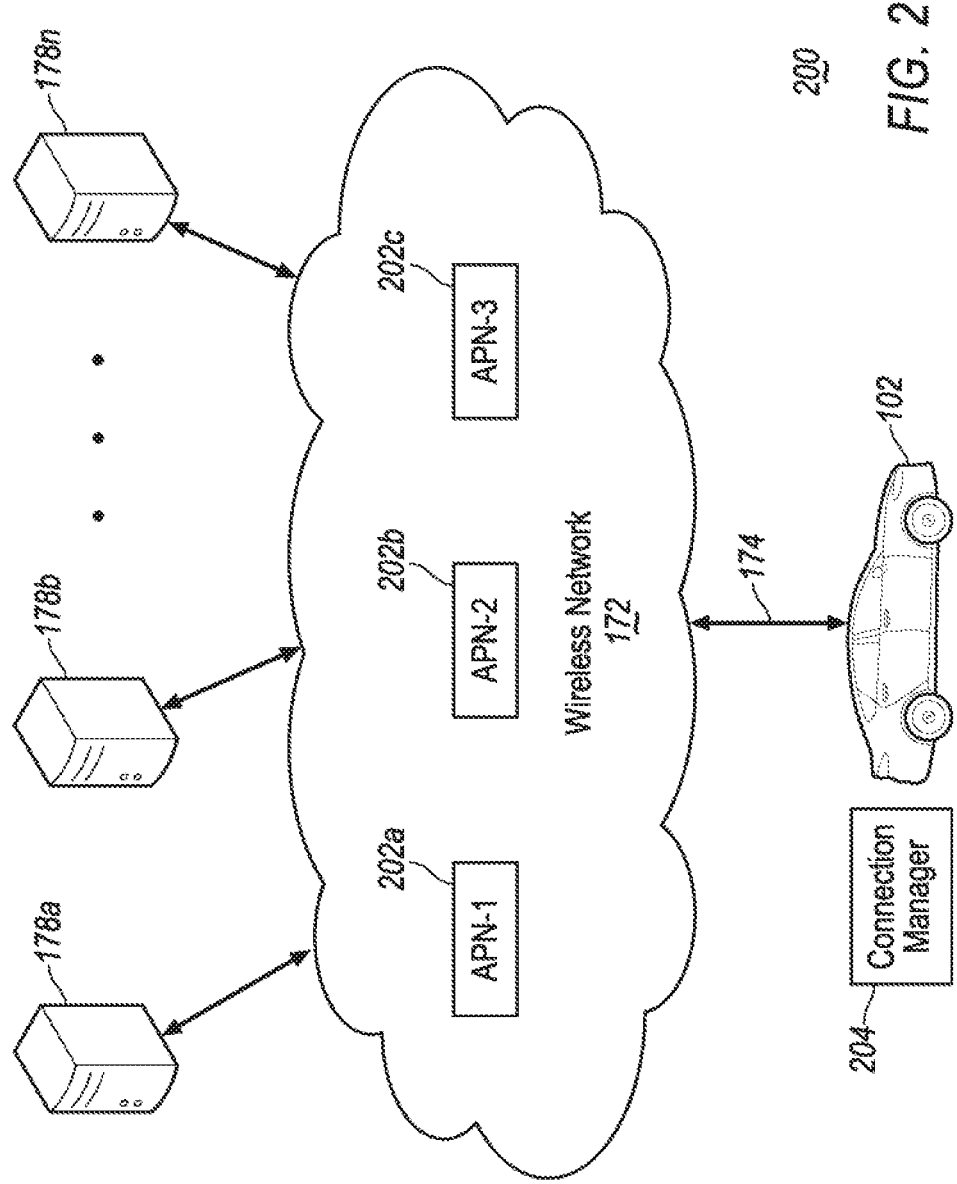

HIGH PRIORITY NETWORK TRAFFIC HANDLING

TECHNICAL FIELD

The present disclosure generally relates to a vehicle communication system. More specifically, the present disclosure relates to a vehicle communication system for prioritizing network traffic.

BACKGROUND

Many vehicles are provided with telecommunication capabilities to connect to a wireless network. A telematics control unit (TCU) of a vehicle may be configured to provide internet connectivity. The TCU may be provided with a wireless modem and software application to connected to a wireless network (e.g. a cellular network). Combined with a vehicle infotainment system, the TCU may provide a variety of features such as vehicle remote control, real-time traffic update, phone calls, video conference, over-the-air (OTA) update or the like. Different applications may have different communication priorities which may be specified via a quality-of-service (QoS) requirement.

SUMMARY

In one or more illustrative embodiments of the present disclosure, a vehicle include a TCU; and one or more processors in communication with the TCU via an in-vehicle network, programmed to generate a data packet for an application, containing a QoS identifier indicative of priority and a type-of-service (ToS) identifier indicative of sub-priority below the priority for the application; designate an access point name (APN) to the data packet based on the QoS identifier; and communicate the data packet to the TCU to communicate to a wireless network.

In one or more illustrative embodiments of the present disclosure, a method for a vehicle includes generating, by an electronic control unit (ECU), a data packet having a QoS identifier indicative of priority and a ToS identifier indicative of sub-priority below the priority for an application of the ECU; assigning, by a processor, an APN to the data packet based on the QoS identifier; connecting, by a TCU, to an access point (AP) corresponding to the APN of a wireless network; and sending, by the TCU, the data packet to the AP.

In one or more illustrative embodiments of the present disclosure, a non-transitory computer readable medium comprises instructions, when executed by a vehicle, causing the vehicle to generate a data packet for an application of the vehicle, the data packet having a QoS identifier based on priority and a ToS identifier based on sub-priority below the priority for the application; designate an APN to the data packet based on the QoS identifier; and communicate the data packet to a TCU to communicate to a wireless network.

BRIEF DESCRIPTION OF THE DRAWINGS

For a better understanding of the invention and to show how it may be performed, embodiments thereof will now be described, by way of non-limiting example only, with reference to the accompanying drawings, in which:

FIG. 2 illustrates an example schematic diagram of a vehicle wireless network of one embodiment of the present disclosure;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle telecommunication system. More specifically, the present disclosure proposes a vehicle telecommunication system for prioritizing traffic using QoS and ToS configurations.

Figure 1:
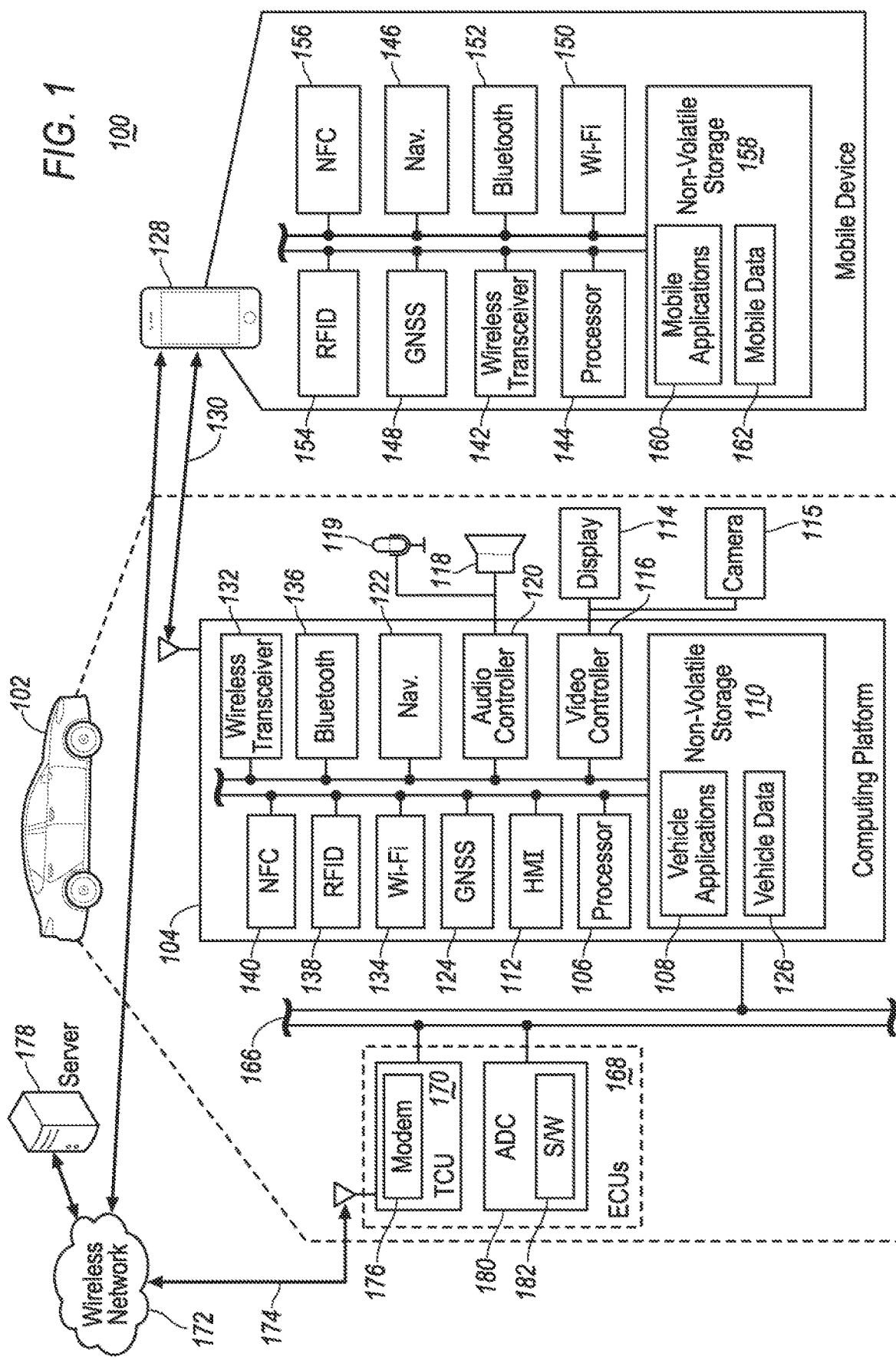
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, vehicle data collection, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 and cameras 115 configured to provide visual output and input to/from vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 and microphones 119 configured to provide audio output and input to/from vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as a part of the vehicle applications 108.

The computing platform 104 may be configured to wirelessly communicate with a mobile device 128 of the vehicle users/occupants via a wireless connection 130. The mobile device 128 may be any of various types of portable computing device, such as cellular phones, tablet computers, wearable devices, smart watches, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a Bluetooth controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples.

The computing platform 104 may be configured to communicate with various ECUs 168 of the vehicle 102 configured to perform various options. For instance, the computing platform may be configured to communicate with a TCU 170 configured to control telecommunication between vehicle 102 and a wireless network 172 through a wireless connection 174 using a modem 176. The wireless connection 174 may be in the form of various communication network e.g. a cellular network. Through the wireless network 172, the vehicle may access one or more servers 178 to access various content for various purposes. It is noted that the term wireless network is used as a general term in the present disclosure and may include any computing network involving carriers, router, computers, controllers or the like configured to store data and perform data processing functions and facilitate communication between various entities. The ECUs 168 may further include an autonomous driving controller (ADC) 180 operated by software 182 configured to provide autonomous driving features to the vehicle 102. The software 182 may be stored locally in the ADC 180. Over-the-air (OTA) software update may be provided to the ADC software 182 via the wireless network through the TCU 170.

Referring to FIG. 2, an example schematic diagram of a vehicle wireless network 200 is illustrated. With continuing reference to FIG. 1, the vehicle 102 is configured to communicate with one or more servers 178 via the wireless network (a.k.a. carrier network) 172. The wireless network 172 may include multiple APs 202 each designated with an APN. Each AP 202 may include one or more routers configured to direct/forward network traffic of the wireless network 172. In the present example, the wireless network 172 may include a first AP 202a designated with APN-1, a second AP 202b designated with APN-2, and a third AP 202c designated with APN-3. The wireless network 172 may further include other APs 202 which are not described in the present description for simplicity purposes. Each AP 202 may be assigned with a network priority for data packets going through each respective AP 202. For instance, the first AP 202a may be assigned with normal network priority. The second AP 202b may be assigned with higher network priority. The third AP 202c may be assigned with real-time network priority which is the highest among all the examples presented in the description. Each priority assigned to the respective AP 202 may correspond to a quality-of-service (QoS) requirement of a data packet associated with a vehicle application 108 or software 182.

As discussed above, the vehicle 102 may have various applications 108 configured to provide various features. For instance, the applications 108 may include a vehicle diagnostic application configured to log vehicle events and communicate the vehicle log to a server 178. Depending on the nature of the vehicle event, different QoS may be assigned to the diagnostic application 108. For instance, the diagnostic application 108 may be assigned with QoS corresponding to normal network priority associated with the first AP 202a. The applications 108 may further include a navigation application configured to provide navigation features to the vehicle 102. The navigation application 108 may be configured to download map and traffic data from a server 178 to perform route planning. The navigation application 108 may be assigned with a higher QoS corresponding to the higher network priority associated with the second AP 202b. Additionally, the ADC software 182 may be in communication with one or more servers 178 to provide autonomous driving features. Due to the critical nature of the autonomous driving features, data packets associated with the ADC software 182 may be assigned with the highest QoS corresponding to the real-time network traffic priority associated with the third AP 202c. The above are merely a few examples of software applications communicating with the wireless network 172. The present disclosure may include more applications configured to provide various features. As a few more non-limiting examples, the applications 108 may include a voice/video call application configured to provide audio and video communications via the audio controller 120 and video controller 116. The applications 108 may further include an over-the-air (OTA) software update program configured to provide OTA software updates via the TCU 170. Traffics between each application 108 and the respective AP 202 may be managed by a connection manager 204 implemented by the computing platform 104.

Figure 3A:
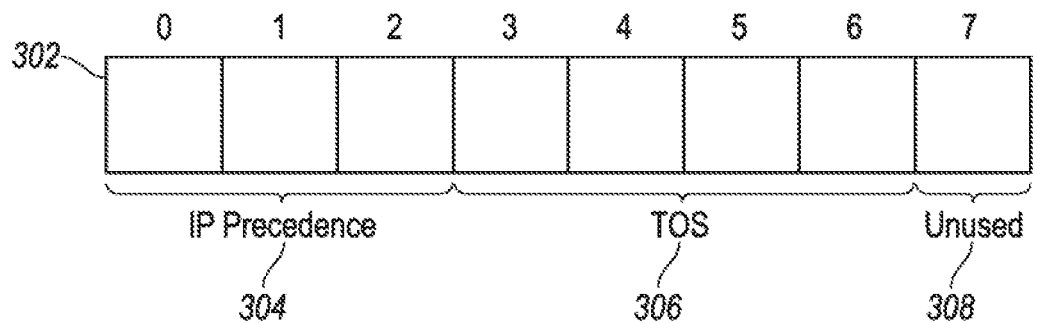
FIGS. 3A and 3B illustrate examples of type-of-service header utilized in one embodiment of the present disclosure.
Figure 3B:
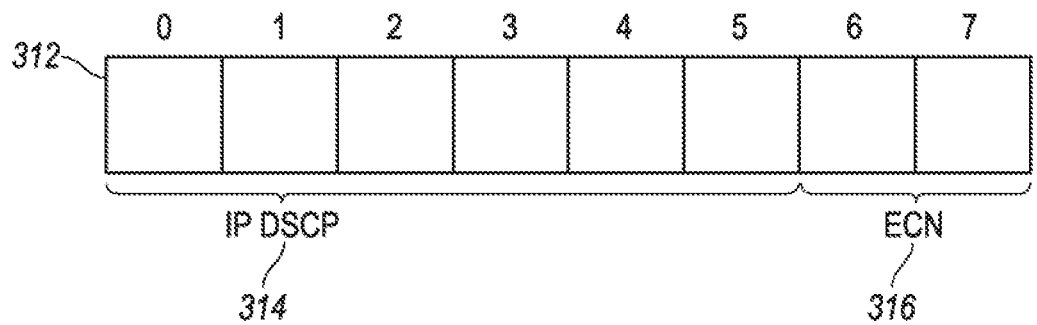

Within the same AP 202, data packets may be further prioritized according to a type-of-service (ToS) configuration of each respective data packet. Referring to FIGS. 3A and 3B, example diagrams 300 for a ToS header under the Internet Protocol (IP) configuration is illustrated. The ToS header 302 as illustrated in FIG. 3A refers to the ToS header defined in IP request for comments (RFC) 791, whereas the ToS header 312 as illustrated in FIG. 3B refers to the ToS header defined in IP RFC 2474 and 3168. Referring to FIG. 3A, the ToS header 302 includes eight digits. From left to right, the first three digits (from 0 to 2) define an IP precedence field 304, the next four digits (from 3 to 6) define a ToS field 306, and the last digit is unused 308. Referring to table 310, the IP precedence 304 defines a communication priority for data packets. Taking the above video call situation for instance, while both the audio packets and the video packets of the vehicle application 108 may be assigned with the same QoS configuration, the ToS header for the audio packets may be assigned with a higher IP precedence 304 (e.g. 010 "immediate") than the video packets (e.g. 001 "priority"). By doing that, APs 202 take audio data packets precedence over video packets to maximize audio quality of the call. In addition, the ToS field 306 include four digits which indicate throughput type, reliability type, delay type, and cost from left to right respectively. Each respective AP 202 may be further configured to use the ToS field 306 to prioritize data packets under predefined rules to facilitate communication between the vehicle 102 and the servers 178. Under the IP RFC 2474 and 3168, the original ToS header 302 illustrated in FIG. 3A has been replaced by the new ToS header (a.k.a Differentiated Services (DS) header) 312. The new ToS header includes a six-digit Differentiated Services Code Point (DSCP) field 314 and an Explicit Congestion Notification (ECN) field 316. Despite the change from the original ToS header 302, the APs 202 may be configured to use the new ToS header 312 to prioritize data packets under substantially the same principle.

Figure 4:
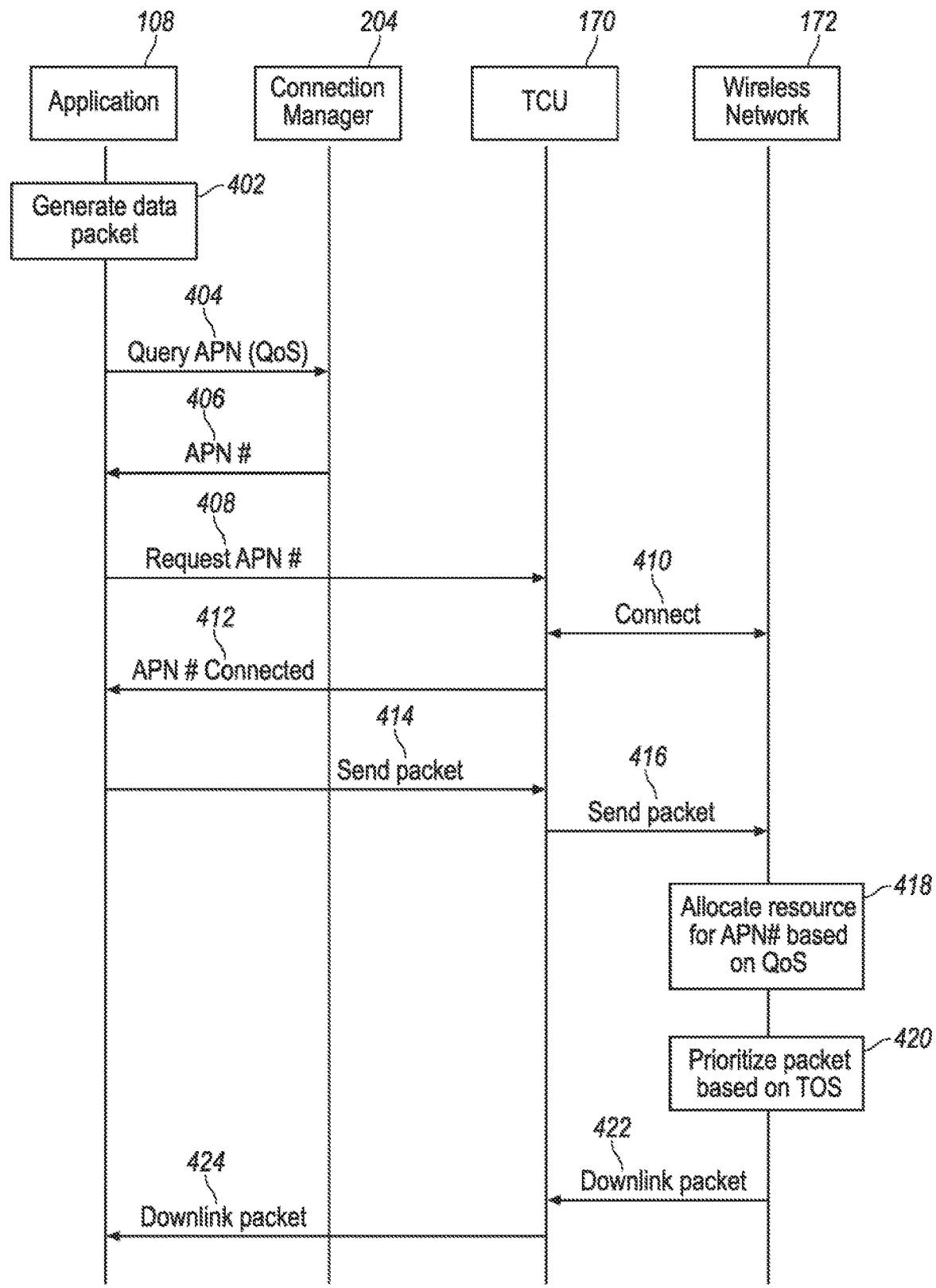
FIG. 4 illustrates an example data flow diagram of one embodiment of the present disclosure.

Referring to FIG. 4, an example data flow diagram of one embodiment of the present disclosure is illustrated. With continuing reference to FIGS. 1-3, at operation 402, an application 108 generates a data packet to communicate to the remote server 178. The generated data packet includes both QoS configuration and ToS configuration based on the priority of the communication. For instance, the computing platform 104 or the ECU 168 may be configured to use the QoS to designate a primary priority of the data packet, and further use the ToS to designate a secondary priority under the primary priority to make use of the network resources efficiently. The application 108 used in the present example may refer to any vehicle applications 108, mobile applications 160, and/or ECU software (e.g. ADC software 182) associated with the vehicle 102. The operations of application 108 may be implemented via the processor 106 of the computing platform 108, the processor 144 of the mobile device, and/or the ECUs 168. At operation 404, the application 108 queries the connection manager 204 for an APN based on the QoS of the data packet as generated. In response, at operation 406, the connection manager 204 issues the data packet with an APN based on the QoS of the data packet. Additionally or alternatively, the connection manager 204 may be configured to assign the same APN to all packets from/to a predefined application without differentiating the QoS requirement for each specific data packet. The operation of connection manager 204 may be implemented via the processor 106 of the computing platform 104. With the APN assigned by the connection manager 204, at operation 408, the application 108 requests the TCU 170 to connect to the APN. In response, at operation 410, the TCU 170 connects to the wireless network 172 using the APN as received and report to the application responsive to a successful connection at operation 412.

At operation 414, the application transmits the data packet to the TCU 170 to send out to the wireless network 172 at operation 416. At operation 418, the wireless network 172 allocates the packet to the corresponding AP 202 using the APN. The wireless network 172 schedules available radio resource to each AP 202 based on predefined APN QoS value. In case that there is not enough radio resource available, the wireless network allocates radio resource to APs 202 with higher priority. In this way, data packets for more prioritized APs 202 with higher QoS requirement are delivered before data packets with lower QoS. At operation 420, the respective AP 202 handling the data packet from the TCU 170 further prioritized the packet based on the ToS header of the packet. As discussed above, data packets having the same QoS configuration may be further prioritized by different ToS header. In this way, the same AP 202 may handle different data packet differently to deliver packets with certain predefined ToS value before packets with other predefined ToS value. At operation 422, the wireless network 172 sends a downlink packet to the TCU 170 via the same AP 202, and the TCU transmits the downlink packet to the application 108 at operation 424.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
   a telematics control unit (TCU); and
   one or more processors in communication with the TCU via an in-vehicle network, programmed to
      generate a plurality of data packets for an application, assigning a quality-of-service (QoS) identifier indicative of priority to each of the plurality of data packets,
      assigning a first type-of-service (ToS) identifier to a first data packet associated with a first service of the application, and a second ToS identifier to a second data packet associated with a second service of the application, wherein ToS identifier is indicative of sub-priority below the priority for the application, and the first ToS identifier is indicative of a higher sub-priority over the second ToS identifier,
      designate an access point name (APN) to the data packet based on the QoS identifiers, and
      communicate the data packet to the TCU to communicate to a wireless network.

2. The vehicle of claim 1, wherein the one or more processors are further programmed to assign all data packets of the application with the same QoS identifier.

3. The vehicle of claim 1, wherein the TCU is further programmed to
   responsive to receiving, from the one or more processors, a request to connect to an access point (AP) corresponding to the APN, connect to the AP via the wireless network; and
   responsive to successfully connecting to the AP, send a connection acknowledgement to the one or more processors.

4. The vehicle of claim 3, wherein the TCU is further programmed to transmit the data packet to the wireless network via the AP.

5. The vehicle of claim 4, wherein the TCU is further programmed to responsive to receiving a second data packet via the AP designated to the application, communicate the second data packet to the one or more processors.

6. The vehicle of claim 1, wherein the ToS identifier includes a ToS header according to request for comments number 791 of Internet Protocol.

7. The vehicle of claim 1, wherein the ToS identifier includes a Differentiated Services header according to request for comments number 2474 or number 3168 of Internet Protocol.

8. The vehicle of claim 1, wherein the wireless network includes a cellular network.

9. A method for a vehicle, comprising:
   generating, by an electronic control unit (ECU), a plurality of data packets for an application, wherein the data packets has a quality-of-service (QoS) identifier indicative of priority and a plurality of type-of-service (ToS) identifiers indicative of sub-priority below the priority for the application;
   assigning, by a processor, an access point name (APN) to the data packet based on the QoS identifier;
   connecting, by a telematics control unit (TCU), to an access point (AP) corresponding to the APN of a wireless network; and
   sending, by the TCU, the data packet to the AP.

10. The method of claim 9, further comprising:
    sending the QoS identifier from the ECU to the processor to query for the APN; and
    responding the APN as assigned from the processor to the ECU.

11. The method of claim 9, wherein the ToS identifier includes a ToS header according to request for comments number 791 of Internet Protocol.

12. The method of claim 9, wherein the ToS identifier includes a Differentiated Services header according to request for comments number 2474 or number 3168 of Internet Protocol.

13. The method of claim 9, wherein the wireless network includes a cellular network.

14. A non-transitory computer readable medium comprising instructions, when executed by a vehicle, causing the vehicle to:
    generate a plurality of data packets for an application of the vehicle, the data packets having a quality-of-service (QoS) identifier based on priority and a plurality of type-of-service (ToS) identifiers based on sub-priority below the priority for the application;
    designate an access point name (APN) to the data packet based on the QoS identifier; and
    communicate the data packet to a telematic control unit (TCU) to communicate to a wireless network.

15. The non-transitory computer readable medium of claim 14, further comprises instructions, when executed by a vehicle, causing the vehicle to:
    request to connect to an access point (AP) corresponding to the APN as designated via the wireless network; and
    responsive to successfully connecting to the AP, acknowledge the application of the successful connection.

16. The non-transitory computer readable medium of claim 15, further comprises instructions, when executed by a vehicle, causing the vehicle to:
    transmit the data packet to the wireless network via the AP.

17. The non-transitory computer readable medium of claim 16, further comprises instructions, when executed by a vehicle, causing the vehicle to:
    responsive to receiving a second data packet via the AP designated to the application, communicate the second data packet to the application.

* * * * *